United States Patent
Reeves et al.

(10) Patent No.: US 7,793,042 B2
(45) Date of Patent: Sep. 7, 2010

(54) SYSTEM, METHOD, AND MODULE FOR REDUCING POWER STATES FOR STORAGE DEVICES AND ASSOCIATED LOGICAL VOLUMES

(75) Inventors: Drue Reeves, Round Rock, TX (US);
Eric Endebrock, Round Rock, TX (US);
Kevin Marks, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 721 days.

(21) Appl. No.: 11/620,532

(22) Filed: Jan. 5, 2007

(65) Prior Publication Data
US 2008/0168223 A1    Jul. 10, 2008

(51) Int. Cl.
*G06F 12/00* (2006.01)
*G06F 13/00* (2006.01)
(52) U.S. Cl. ............... 711/114; 711/100; 711/154; 711/200
(58) Field of Classification Search ................ 711/100, 711/111, 154, 200, 114
See application file for complete search history.

(56) References Cited

U.S. PATENT DOCUMENTS

| | | | |
|---|---|---|---|
| 6,583,947 B1 | 6/2003 | Hakamata et al. | |
| 7,035,972 B2 | 4/2006 | Guha et al. | |
| 7,093,088 B1* | 8/2006 | Todd et al. | 711/162 |
| 7,145,770 B1 | 12/2006 | Zimlin et al. | |
| 2007/0124366 A1* | 5/2007 | Shobayashi | 709/203 |

FOREIGN PATENT DOCUMENTS

GB    2410345 A    7/2005

OTHER PUBLICATIONS

Combined Search Report and Written Opinion from the Australian Patent Office for SG 200719018-4 dated Jul. 30, 2008, 7 pages.
Combined Search and Examination Report from the UK Intellectual Property Office for GB0725081.4 dated Apr. 17, 2008, 7 pgs.

* cited by examiner

*Primary Examiner*—Tuan V. Thai
(74) *Attorney, Agent, or Firm*—Larson Newman & Abel, LLP (57) ABSTRACT

A system, method, and module for reducing power states for storage devices and associated logical volumes are disclosed. In one form, a method of altering an operating state of a storage device can include detecting a request to access a first logical volume over an interval. The method can also include determining an association of a storage device to the first logical volume. The method can further include determining if the storage device is operably associated with a second logical volume, and altering an operating state of the storage device in response to detecting the request and determining the association with the second logical volume.

14 Claims, 4 Drawing Sheets

SYSTEM, METHOD, AND MODULE FOR REDUCING POWER STATES FOR STORAGE DEVICES AND ASSOCIATED LOGICAL VOLUMES

FIELD OF THE DISCLOSURE

This disclosure relates generally to information handling systems, and more particularly to a system, method, and module for reducing power states for storage devices and associated logical volumes.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Various information handling systems can be realized as servers that can be mounted within server racks. Servers can allow for accessing and serving information, applications, and various types of data to multiple clients via an Intranet, the Internet, or combinations thereof. The complexity and density of servers and associated components for some enterprise data centers impacts environmental and operating conditions of servers within data centers. For example, some data centers include various hardware devices, such as servers, server racks, storage devices, and other electronics that can consume power and dissipate various amounts of thermal energy effecting environmental operating conditions within data centers. In various systems, external storage devices, such as high volume disk drives, are continuously operated leading to consumption and dissipation of large amounts of energy and heat. Such consumption and dissipation can lead to undesired operating conditions of systems within data centers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices, as well as various input and output (I/O) devices, such as a keyboard, a mouse, and a video display. The information handling system can also include one or more buses operable to transmit communications between the various hardware components.

According to one aspect of the disclosure, a method for altering an operating state of a storage device can include detecting a request to access a first logical volume over an interval. The method can also include determining an association of a storage device to the first logical volume. The method can further include determining if the storage device is operably associated with a second logical volume, and altering an operating state of the storage device in response to detecting the request and determining the association with the second logical volume.

According to another aspect of the disclosure, a processing module can include an interface operable to detect a request to access a logical volume operably associated with a plurality of storage devices. The plurality of storage devices can be operably associated with plural logical volumes. The processing module can also include a controller operable to initiate altering an operating status of the logical volume and an associated first storage device in response to detecting the request over an interval.

According to a further aspect of the disclosure, an information handling system can include a controller operable to alter an operating state of a plurality of storage devices and a logical volume manager operably coupled to the controller. The logical volume manager can be operable to detect an I/O request to access information stored in association with a first logical volume operably associated with the plurality of storage devices over an access period. The logical volume manager can also be operable to determine if a first storage device of the plurality of storages devices is operably associated with a second logical volume and the first logical volume. The logical volume manager can further determine an operating state of a second storage device of the plurality of storage device operably associated with the second logical volume and the first logical volume. The logical volume manager can also initiate reducing the operating state of the plurality of storage devices when the I/O request is not detected within the access period.

Figure 1:
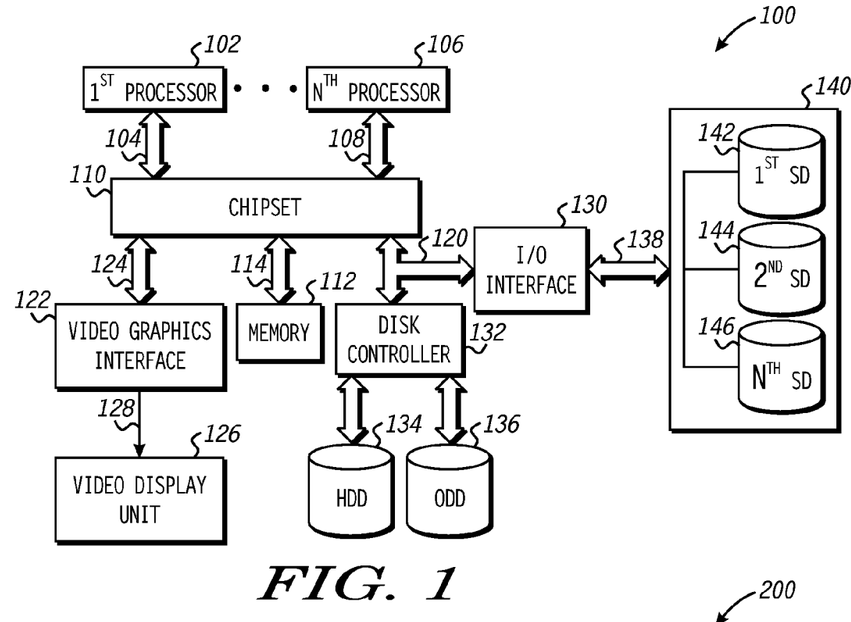
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an I/O controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset also that can include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle input/output (I/O) functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include the I/O interface 130 operably coupled to an external communication bus operable to handle I/O requests for one or more storage devices, such as an external storage device, and internal storage device, or any combination thereof. In one form, the I/O interface 130 can be coupled to an array of storage devices 140 that can include a first storage drive 142, a second storage drive 144, and up to an $n^{th}$ storage drive 146. In one form, the I/O interface 130 can include a logical volume manager module operable to manage access to the first storage drive 142, the second storage drive 144, and the $n^{th}$ storage drive 146 as a single logical volume. As such, the array of storage devices 140 can be provided as a single logical volume or can be provided as multiple volumes as desired. The external bus 138 can include various types of data buses or links including, but not limited to, SCSI, Serial Attached SCSI, Advanced Technology Attachment (ATA), Serial ATA (SATA), or any combination thereof. Additionally, the I/O interface 130 can include logic to control the external drives based on I/O requests made to the external drives, and in some instances, can be used to reduce power outputs for one or more external storage device. In one form, an external storage device can include one or more disk drive, hard disk drive, tape drive, optical drive, flash memory drive, holographic drive, or any combination thereof.

During operation, the I/O interface 130 can be used to measure the amount of I/O requests (e.g., read/write requests) made to an external drive over a period of time. For example, the I/O interface 130 can initiate a command to alter an operating mode or state of one or more storage device based on the frequency of I/O requests made. For example, if an I/O requests is not made over an interval of time (e.g., 30 seconds, 1 minute, 5 minutes, etc.), the I/O interface 130 can communicate a command to alter the operating mode of the storage device. For example, the I/O interface 130 can communicate a command to spin down, or place a storage device in a standby mode. According to one aspect, the interval of time can be configurable, or in other embodiments, can be preset to a specific value.

In one embodiment, the storage devices coupled to the I/O interface 130 can be provided as a single volume or multiple volumes. As such, the I/O interface 130 can initiate a command to place each storage device associated with a specific volume in reduced operating state when not being accessed. In one form, first storage device 142 and second storage device 144 may be viewed as a single logical volume or virtual disk (VD) and may be used to process I/O requests. In one form, a logical volume can include a VD, a combination of VDs, or various other physical disks that can be used in association with a VD. Additionally, a VD can include one or more logical volumes as desired. In yet another form, a logical volume can also be considered a VD.

According to one aspect, an I/O request received by the I/O interface 130 may initiate access to information stored only on the first storage device 142 and not the second storage device 144. As such, the I/O interface 130 may present the first storage device 142 and the second storage device 144 as a part of the logical volume or VD 140, and the I/O interface 130 can manage access to each of the storage devices. Additionally, the I/O interface 130 can detect when access to a specific storage device is requested and alter the operating state of the storage device as desired. In this manner, portions of a logical volume or VD can be accessed while other portions of the logical volume can be placed in a reduced power state thereby reducing the overall power consumption of a logical volume or VD for information handling system 100.

In one form, altering an operating state can include providing a reduced power state. For example a reduced power state can include placing a storage device in state that consumes less power than when fully operational. For example, the first storage device 140 can be provided as an external disk drive that can be slowed or stopped in association with a reduced power state. Additionally, logic operably associated with the external disk drive may remain active to detect inputs from the I/O interface 130. For example, the external disk drive can include sufficient operational logic to process inputs provided by the I/O interface 130 such as non-media or drive access commands. In this manner, the I/O interface 130 can issue a command to return an external drive to an active operating state to allow access to content stored within the external disk drive in response to a request being received.

In another form, the information handling system 100 can issue an I/O request to the I/O interface 130, and the I/O interface 130 can request a storage device to be placed in an active operating state to satisfy the I/O request provided by the information handling system 100. According to one aspect, the I/O interface 130 can issue a busy signal or other delay signal to the information handling system 100 until the storage device can service the I/O request.

According to another aspect, the I/O interface 130 can include a memory, cache, buffer, or other memory operable to store information associated with I/O requests. For example, if the information handling system 100 receives a read request for information stored within a specific volume, the I/O interface 130 can access a memory buffer to determine if the I/O request can be satisfied using contents or information stored within the memory buffer. In another embodiment, if the information handling system 100 makes a write request to one or more of the storage devices, the I/O interface 130 can place the information to be written within the memory buffer, and upon the external drive becoming available, the contents of the memory can be written to the appropriate storage device as desired. As such, by providing storage devices having modifiable operating states that can be altered based on I/O requests of an information handling system over an interval of time, a reduction in power consumption of one or storage devices can be provided to reduce the overall amount of power dissipated by the storage device, and potentially reducing cooling that may be required.

Figure 2:
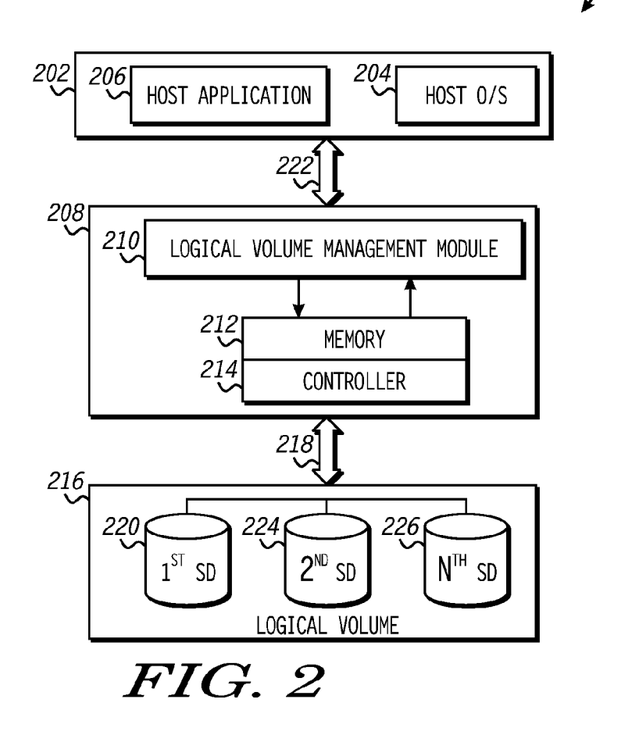
FIG. 2 illustrates a functional block diagram of a system for altering operating states of storage devices according to another aspect of the disclosure.

FIG. 2 illustrates a functional block diagram of a system for altering operating states of storage devices, depicted generally as system 200. The system 200 can be employed, in whole or in part, by the information handling system 100 illustrated in FIG. 1, or any other type of system than can be used to provide the system 200.

The system 200 can include a host system 202 including a host operating system (O/S) 204 and a host application 206. In one form, the host system 202 can include the information handling system 100 illustrated in FIG. 1. The system 200 can also include an I/O interface 208 that can include a logical volume management (LVM) module 210, a memory 212, and a controller 214. The I/O interface 208 can be coupled to the host system 202 via a host communication link 222 and can be operable to access one or more logical volumes 216 coupled to the I/O interface 208 using a volume communication link 218. In one form, the host communication link 222 or the volume communication link 218, or any combination thereof, can be operable using ATA, SATA, SCSI, Serial Attached SCSI, Ethernet, or various other types of communication links or communication mediums that can be used to access a logical volume, VD, storage device, external hard drive, or various other types of devices or virtual devices that may be employed by the system 200.

In one form, the I/O interface 208 can be operable to access a first storage device 220, a second storage device 224, and n$^{th}$ storage device 226. In one form, the logical volume 216 can be provided as a single logical volume or can be provided as multiple logical volumes. Additionally, one or more of the storage devices of the logical volume 216 can be used with an additional logical volume. Additionally, a logical volume can also be viewed as a logical unit, virtual disk, or various other forms, operable to be presented as a logical storage resource to an information handling system. For example, an information handling system can view the logical volume 216 as a single logical volume and the I/O interface 208 can present the information handling system as such. The LVM module 210 can manage access to a specific drive within the logical volume 216. However in other forms, access can be managed by a controller associated with a single logical volume or storage device.

According to another aspect, the system 200 and the I/O interface 208 can be provided as a part of the host system 202. In one form, the system 200 can be a Just a Bunch of Disks (JBOD) system. In another embodiment, the I/O interface 208 or portions thereof can be provided as a part of the logical volume 216 and associated controllers can also be provided. For example, the logical volume 216 can include a Redundant Array of Inexpensive Disks (RAID) controller for controlling access to each storage device for processing I/O requests. The RAID controller can also include the logic to provide the I/O interface 208. In another form, the I/O interface 208 can include a SCSI enclosure processor (SEP) operable to house one or more storage devices and provide output power, diagnostic support, environmental control, and various other functions for a storage device. According to one aspect, a SEP can include one or more array elements and associated status circuits for managing and outputting visual indicators of an operating status of one or more storage devices.

During operation, the system 200 can be used to manage an operating status of the logical volume 216 and associated storage devices. The LVM module 210 can be enabled by the host application 206 or the host O/S 204 to monitor access to one or more logical volumes accessible by the host system 202. The LVM module 210 can monitor requests made by a requester, such as host system 202, and during periods of time when one or more logical volumes or storage devices are not being accessed, the LVM module 210 can initiate a request to place one or more of the storage devices or logical volumes in a low operating state to conserve energy. According to one aspect, the LVM module 210 can spin down a storage device that include a disk drive and place the storage device in a stand-by operating state or mode based on the amount or frequency of an I/O request made. For example, if no I/O requests have been made during an interval, the LVM module 210 can issue a command to alter an operating mode. For example, the LVM module 210 can be operable as a SCSI enabled module and can issue a "START STOP UNIT" command. The LVM module 210 can further provide an associated "START" bit within the command and set the "START" bit to zero for each drive in specific volume that has not received an I/O request over an interval. For example, the first storage device 220 and the second storage device 224 can be provided as the logical volume 216. As such, a "START" bit can be altered to place the first storage device 220 and the second storage device 224 to spin down the storage devices. According to another aspect, the LVM module 210 and the logical volume 216 may be SATA enabled. As such, an ATA "STANDBY IMMEDIATE" command can be provided by the LVM module 210 to alter an operating condition of one or more of the storage devices. In one form, the logical volume 216 and associated storage devices can receive non-media access commands from the LVM module 210 and can be returned to an operating state to service I/O requests.

In one form, the I/O interface 208 or an associated controller may not include the memory 212. As such, an I/O request can be made, and the LVM module 210 can issue a command to the host O/S 204 to indicate that the host O/S 204 should wait for a period of time before issuing I/O commands or requests to a logical volume. In another embodiment, I/O commands or requests can be provided as SCSI commands over a SCSI transport protocol. For example, a "START STOP UNIT" command can be provided to initiate access to a logical volume. In one form, a SCSI enabled system can include SCSI transports protocol that allow for providing delay times as a part of a SCSI status response to allow for a logical volume to be activated or spun up to an operating mode. In one form, a SCSI transport protocol status such as a "BUSY" status can be reported that includes a "RETRY DELAY" value as a part of the "BUSY" status to indicate a length of time to delay prior to making a subsequent I/O request to such logical volume.

In one form, an I/O request can be serviced using the memory 212 of the I/O interface 208 when a storage device may be in a reduced operating state. For example, the LVM module 210 can access the memory 212 during a read I/O request and determine if the information requested may reside within memory 212. If the information-resides within the memory 212, the LVM module 210 can obtain the requested information thereby leaving the storage device in a reduced operating state. In another form, the LVM module 210 can receive a write I/O request for a specific storage device or logical volume that may be placed within a reduced operating state. As such, the memory 212 can store the information to be written to the logical volume or specific storage device, and upon the logical volume or storage device becoming available (e.g. placed in an active operating state or mode), the stored contents within the memory 212 can be written to the appropriate volume or storage device as desired.

In one form, a policy or other governing logic can be issued to one or more of the I/O interface 208 or the logical volume 216. For example, a policy can be used to set an access period for altering an operating state of the logical volume 216 and associated storage devices. The policy can be provided by a system administrator that can modify operating parameters or values that can be used by several information handling systems. In one form, a policy can include parameters or values that can be used to altering I/O request interval or volume requirements that may be required prior to placing a storage device or logical volume in a reduced operating state. In other forms, a policy can include delay time values that can be provided in response to an I/O request made to a logical volume or storage device that may be placed in a reduced operating state to allow for one or more storage devices to be returned to an operating state. In the manner, a requesting system can wait for a period of time prior to issuing another I/O request. Various other values or attributes can also be provided by a policy and used by the system 200.

Figure 3:
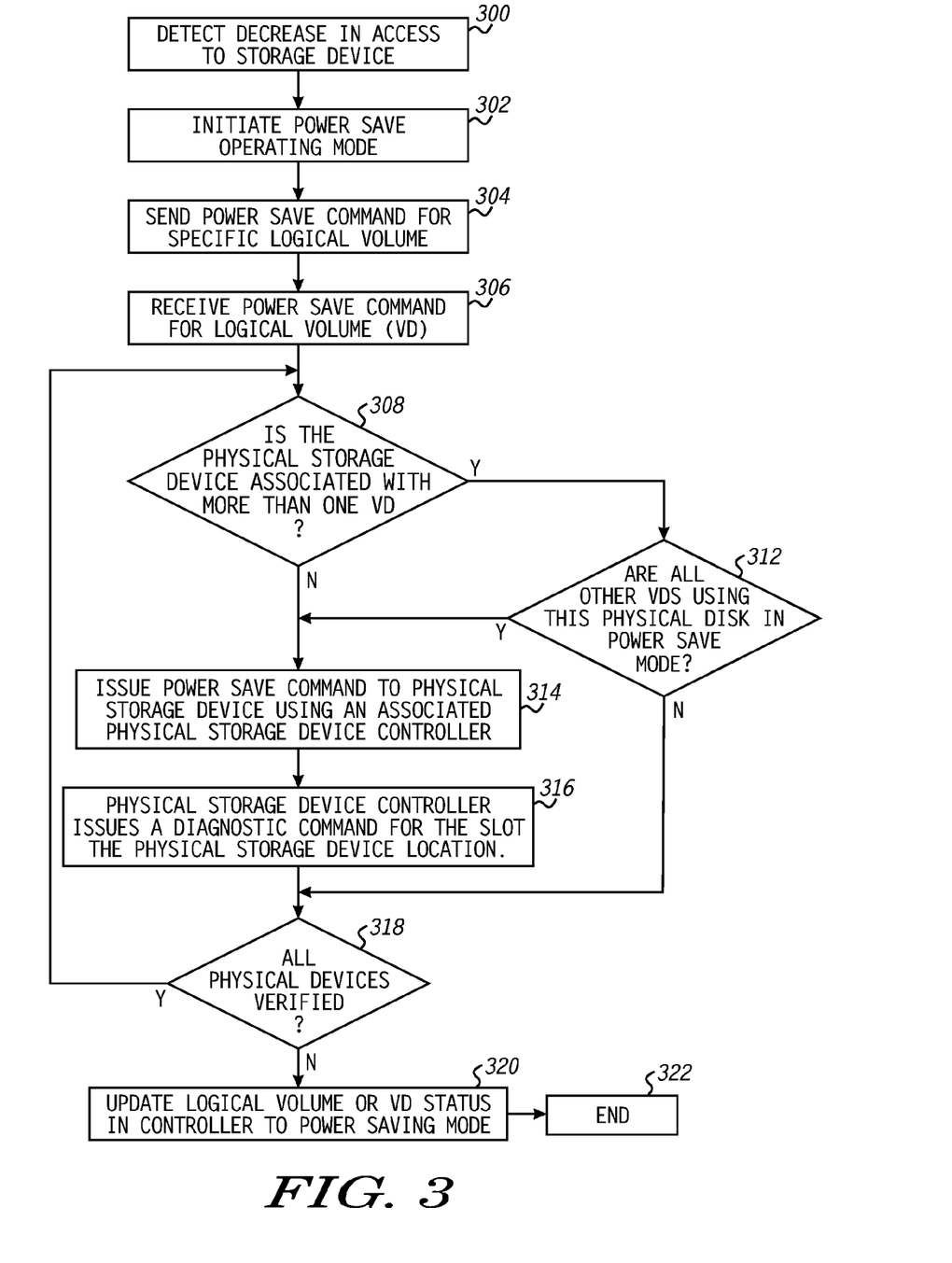
FIG. 3 illustrates a flow diagram of a method of providing reduced operating states for storage devices according to a one aspect of the disclosure.

FIG. 3 illustrates a flow diagram of a method for providing reduced operating states for storage devices. The method of FIG. 3 can be employed in whole, or in part, by the information handling system 100 depicted in FIG. 1, the system 200 illustrated in FIG. 2, or any other type of system, controller, device, module, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at block 300 when a decrease in access to a storage device is detected. For example, one or more storage devices, such as physical disk drives, or other storage devices, operable to store data or various types of information, can be monitored to detect changes in access to data stored within a storage device. In one form, an LVM can be used to provide access to a VD that includes one or more storage devices. The VD can include a single logical volume that uses multiple storage devices to store information, and can provide an appearance of being a single logical volume. In another embodiment, multiple logical volumes or VDs can be provided in association with a plurality of storage devices that can be accessed using a LVM. Various other storage devices, VDs, logical volumes, associated LVMs, or any combination thereof can be used as desired.

According to one aspect, decreases in access can be detected when a specific period of time elapses for accessing one or more physical disk drives, logical volumes, VDs, or any combination thereof. For example, I/O requests, such as read or write requests, can be monitored over a period of time. As such, altering an operating state of a physical disk drive, logical volume, VDs, or any combination thereof, may be advantageous. Upon detecting a decrease in access (e.g., an I/O requests not detected for one minute, three minutes, ten minutes, etc.), the method can proceed to block 302 and an operating state for storage device, such as power save mode, can be initiated. For example, a power save mode can include disabling a portion, or all, of a storage device. In one embodiment, a portion of a storage device can include "spinning down" a disk drive, reducing power provided to the storage device, limiting access to the storage device, or various other forms of power saving operating modes that can be provided. In one form, an LVM can initiate a power save mode to alter an operating mode of a specific VD and one or more storage devices.

The method can then proceed to block 304, and a power save command can be communicated for a specific logical volume or VD to be placed in a power save operating mode. For example, a "START STOP UNIT" command can be communicated by an LVM to initiate a low power operating state for a specific logical unit or VD. At block 306, the power save command for the logical volume or VD may be received and processed to determine if an operating condition for an associated physical storage device can be modified. At block 308, the method can determine if a physical storage device associated with the VD or logical volume belongs to another logical volume or VD. For example, a physical storage device can be associated with multiple VDs or logical volumes, and be responsive to I/O requests for each logical volume or VD. As such, if a physical storage device is associated with more than one VD or logical volume, the method can proceed to block 312 and determine if any other VDs or logical volumes operably associated with the physical storage device are in a power save operating mode. For example, a physical storage device can be used by multiple logical volumes or VDs. As such, at block 312 the method can determine if all other VDs are placed in a power save mode. For example, a RAID controller can include a data structure that can maintain what state each logical volume or VD is in. If all other VDs or logical volumes are in a power save mode, the method can proceed to block 314.

In one embodiment, if at decision block 308, the physical storage device does not belong to more than one logical volume or VD, the method can proceed to block 314 and a power save command can be issued to the physical storage device. For example, the physical storage device can be operably coupled to a physical storage device controller, such as a RAID controller, operable to control an operating state of one or more associated physical storage devices. As such, the RAID controller can issue a "START STOP UNIT" command to the physical storage device to place the physical storage device in a reduced power operating state. Upon issuing the power save command, the method can proceed to block 316 and update an operating status of the physical storage device, logical volume, VD, or any combination thereof. For example, the logical volume can be operably associated with a system employing a SCSI enclosure processor. As such, an update command, such as a "SEND DIAGNOSTIC" command can be sent to the SCSI enclosure processor indicating that the physical storage device located within a specific slot or location of the SCSI enclosure may be placed in a power save operating mode.

The method can then proceed to decision block 318 and determine if each physical storage device associated with a logical volume has been checked or verified. If each physical storage device has been checked or verified, the method can proceed to block 320 and a status for the logical volume or VD can be updated within a physical storage device controller. For example, a status within a RAID controller can be updated to indicate the logical volume, and associated physical storage devices, are in a power save operating mode. The method can then proceed to block 322 and end. If at decision block 318 all physical storage device have not been verified, the method can proceed to decision block 308.

Figure 4:
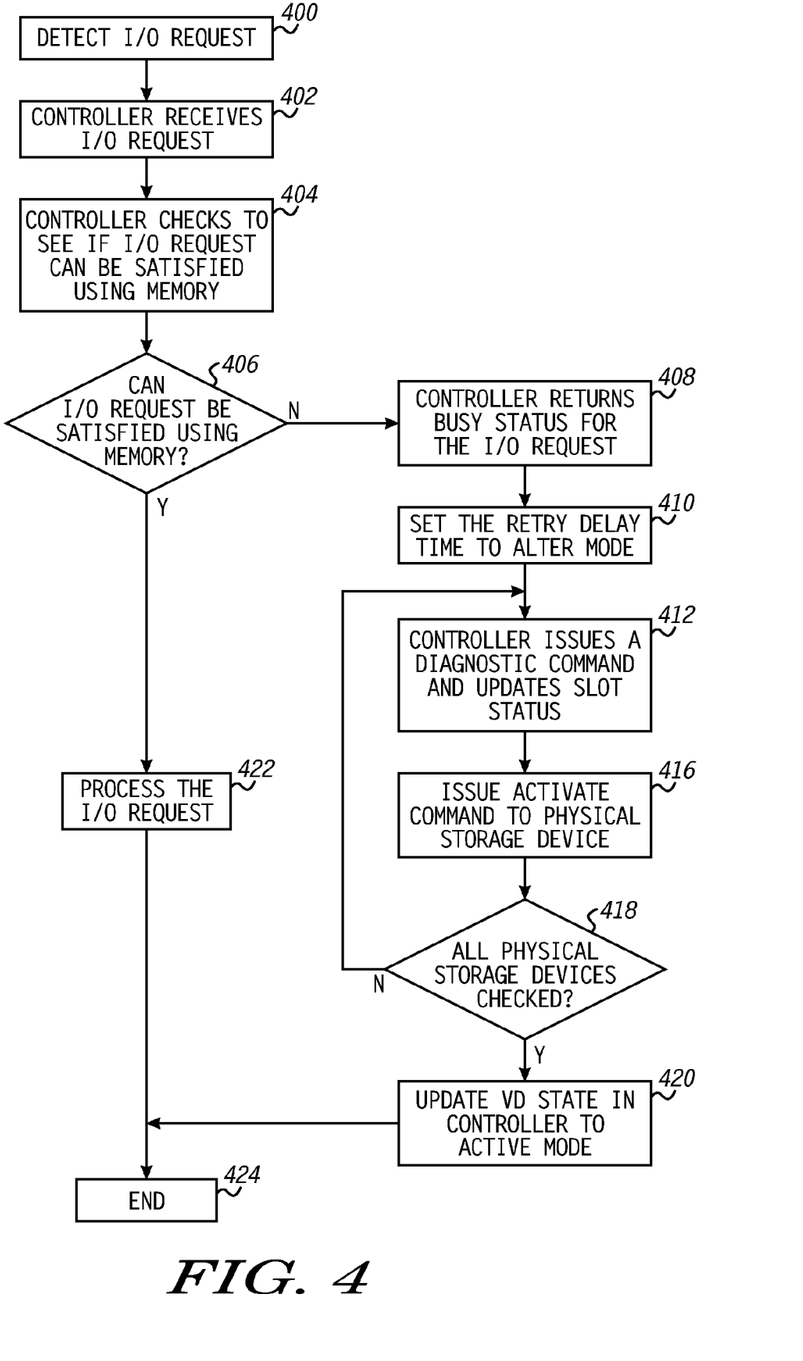
FIG. 4 illustrates a flow diagram of a method of a reduced operating state for a storage device according to a one aspect of the disclosure.

FIG. 4 illustrates a flow diagram of a method of a reduced operating state for a storage device according to a one aspect of the disclosure. The method of FIG. 4 can be employed in whole or in part by the information handling system 100 depicted in FIG. 1, the system 200 illustrated in FIG. 2, or any other type of information handling system operable to employ all, or portions of, the method of FIG. 4. Additionally, the method can be embodied in various types of encoded logic including software, firmware, hardware, or other forms of digital storage mediums, computer readable mediums or logic, or any combination thereof, operable to provide all, or portions, of the method of FIG. 4.

The method begins generally at block 400 when an I/O request for a specific logical volume or VD can be detected. For example, a physical storage device controller, such as a RAID controller, receives an I/O request to access a logical volume or VD that may be in a reduced operating mode. For example, an I/O request can include a request to read or write information from or to a specific logical volume or VD. At block 402, the controller for the logical volume or VD in a power save mode can receive the request, and at block 404, a controller associated with the logical volume or VD can determine if the I/O request can be satisfied without having altered the power mode of an associated physical storage device. For example, if the controller can access an associated memory, buffer, cache, or other memory such as a RAID controller cache operable to store information for the logical volume or VD. The method can then proceed to decision block 406 and determine if the I/O request can be satisfied using memory. For example, an I/O request including a "read" request can be received, and the contents to be read from a logical volume or VD location may exist within a memory or cache. As such, the memory can be accessed to determine if a read I/O request can be satisfied. In another embodiment, an I/O request can in include a "write" request and an associated memory can be used to store information in association with the write I/O request. For example, a memory or cache associated with a logical volume can be used to store information until the logical volume becomes available. As such, contents for a write I/O request can be buffered or stored within memory or cache until the physical storage device is available or in an active power state.

If at decision block 406, the I/O request can be satisfied without altering the operating condition of the physical storage device, the method proceeds to block 422 and the I/O request is processed using the memory. The method then proceeds to block 424 and ends. If at decision block 406, the I/O request cannot be satisfied using an associated memory, the method can proceed to block 408 the controller for the logical volume or VD can return a busy status for the I/O request. For example, the busy status can be used to indicate to a requester that a logical volume may not presently be available to process the I/O request. In one form, blocks 408 and 410 can be provided within the same block. For example, a SCSI transport protocol status such as a "BUSY" status can be reported that includes a "RETRY DELAY" value as a part of the "BUSY" status to indicate a length of time to delay prior to making a subsequent I/O request to such logical volume.

The method can then proceed to block 410 and, if the supported by a requestor, a delay time for retrying the request can be set. For example, a delay value sufficient to alter an operating mode of the logical volume or VD to be accessed can be set. In one embodiment, the method can be employed by a system that includes a SCSI transport operable to support a "RETRY DELAY TIMER" field. As such, a RAID controller for the logical volume or VD can set the "RETRY DELAY TIMER" value for the logical volume or VD (e.g., 10 seconds, 30 seconds, etc.) to a value sufficient to alter a logical volume or VD, and associated physical storage devices to an active operating mode operable to process the I/O request. The method can then proceed to block 412 and a RAID controller can issue a diagnostic command and update a slot status storing the physical storage device. For example, a "DEVICE OFF" bit can be defined in the array and an array device element of the SCSI ENCLOSURE SERVICES (SES)—2 command set standard can be altered for the slot or location the physical storage device is located in. In one form, the "DEVICE OFF" bit can be altered to allow for I/O requests to be sent to the slot housing physical storage device. The controller associated with the physical disk drive can issue a diagnostic command to update the status of the physical storage device. For example, a RAID controller associated with the physical storage device can issue a diagnostic command, such as a "SEND DIAGNOSTIC" command that includes a "DEVICE OFF" bit set to zero to a SCSI enclosure processor. As such, the SCSI enclosure processor can be updated to allow for use of the physical drive located within a specific location or slot of the SCSI enclosure.

The method then proceeds to block 416 and an activate command can be issued to the physical storage device to alter the operating mode from a power save operating mode to an active operating mode. For example, a RAID controller associated with the physical storage device can issue a "START STOP UNIT" command provide an active power state. The method can then proceed to decision block 418 and if all physical storage devices associated with a logical volume or VD for processing the I/O request are not in an active operating mode, the method can proceed to block 412 and proceeds to update the remaining physical storage devices.

In one embodiment, if at decision block 418, all of the associated physical storage devices are in an active operating state, the method can proceed to block 420 and a reference to the logical volume or VD can be updated within the controller to indicate that the logical volume or VD is available. The method can then proceed to block 424 and end.

Figure 5:
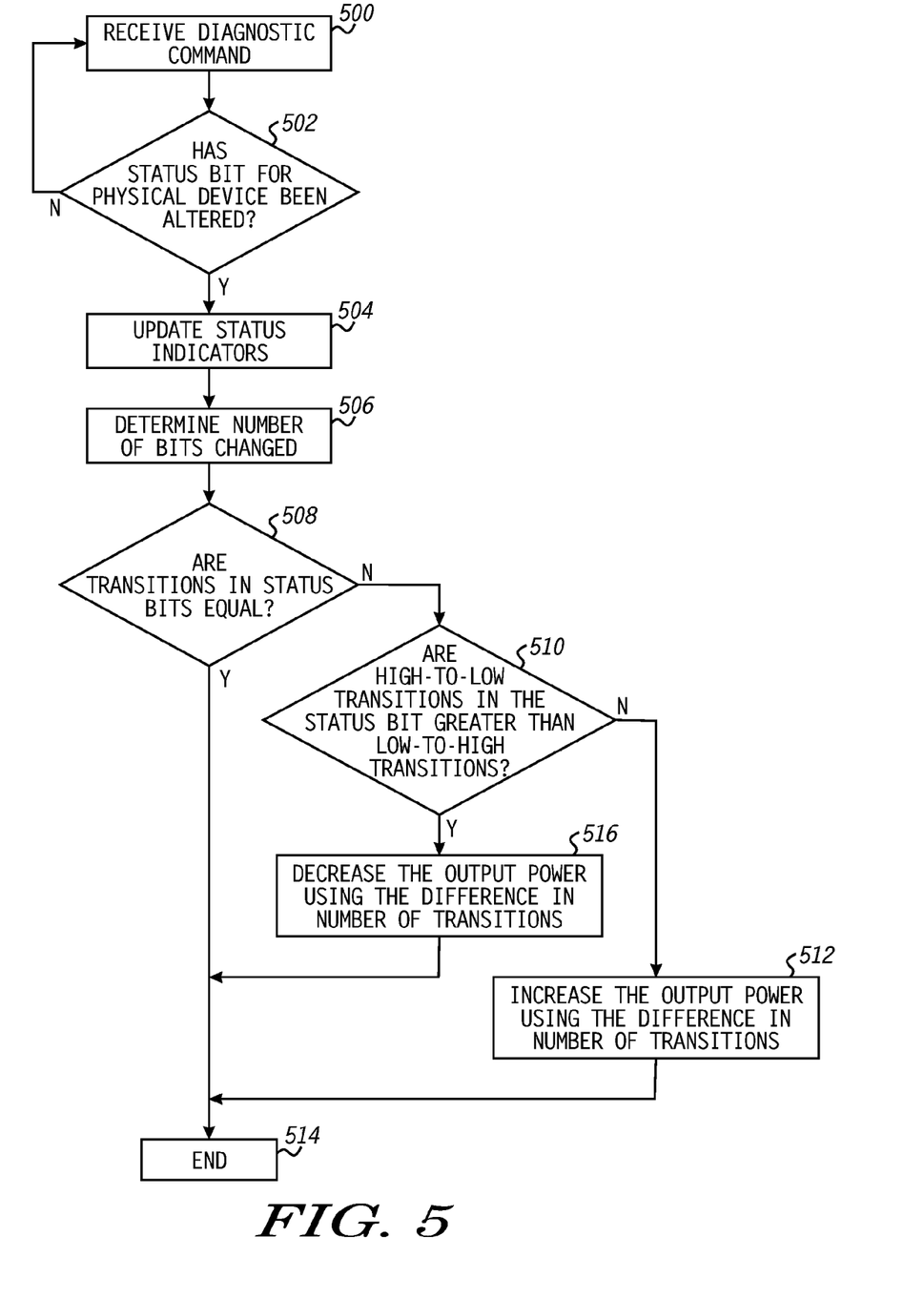
FIG. 5 illustrates a flow diagram of a method of outputting power to storage devices using an operating status according to a one aspect of the disclosure.

FIG. 5 illustrates a flow diagram of a method of outputting power to storage devices based on using an operating status according to a one aspect of the disclosure. The method of FIG. 5 can be employed in whole or in part by the information handling system 100 depicted in FIG. 1, the system 200 illustrated in FIG. 2, or any other type of information handling system operable to employ all, or portions of, the method of FIG. 5. Additionally, the method can be embodied in various types of encoded logic including software, firmware, hardware, or other forms of digital storage mediums, computer readable mediums or logic, or any combination thereof, operable to provide all, or portions, of the method of FIG. 5.

The method begins generally at block 500 when a diagnostic command associated with a physical storage device is received by a processor operable to alter a power output for one or more physical storage device. For example, one or more physical storage devices can be operably associated with an SCSI enclosure processing module or SES module operable to process commands and alter power output to one or more associated storage devices. In one form, a "SEND DIAGNOTIC" command can be received and can include one or more bits to provide status information for one or more physical devices coupled to a SCSI enclosure. At decision block 502, the method can determine if one or more bits or other indication is provided in association with updating a status of a physical storage device. For example, an operating status of a physical storage drive can be updated by altering a bit, such as a "DEVICE OFF" bit within a diagnostic command to provide a status for an array device element operable to represent slots for coupling physical storage devices.

If a bit has not been altered, the method proceeds to block 500 and repeats as desired. If a bit has been altered, the method can proceed to block 504 and an associated indicator (e.g., LED) within the enclosure for a physical drive in a power save mode can be updated to indicate that one or more physical storage device is in a reduced power operating state. The method can then proceed to block 506 and can determine how many bits within the command have been altered. For example, the diagnostic command can include status information for multiple physical storage devices. As such, at block 506, the method determines if multiple bits have been altered and proceeds to decision block 506, and determines if the bit transitions are equal. For example, if the number of physical storage devices that have been altered from a reduced power state equals the number of physical storage devices that have been altered from an operating state to a reduced power state, the number of transitions may be equal. As such, additional changes to output power may not need to be altered and the method can proceed to block 514 and end.

In one embodiment, if at decision block 508, the number of transitions are not equal, the method can proceeds to decision block 510 and determines if the number of high-to-low transitions are greater than the number of low-to-high transitions. For example, if the number of zero-to-one transitions is greater, the method can proceed to block 516 and a reduction in power supply output can be provided. For example, the output can be reduced by a factor of the difference in the number of zero-to-one transitions (e.g., reduced by 2×, 3×, 4×, etc, times the power usage of a drive.). The method can then proceed to block 514 and end. If at decision block 510, the number of zero-to-one transitions is not greater than the number of one-to-zero transitions, the method can proceed to block 512 and the power supply output associated with the physical drives can be increased to accommodate the difference in transitions. As such, sufficient power can be available to enable one or more physical storage devices provided within an enclosure. The method can then proceed to block 514 and end.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of altering an operating state of a storage device comprising:

detecting a request to access a first logical volume over an interval;

determining an association of a storage device to the first logical volume such that the storage device is available to service accesses to the first logical volume;

determining if the storage device is operably associated with a second logical volume such that the storage device is available to service accesses to the first logical volume; and altering an operating state of the storage device in response to detecting the request and determining the association with the first logical volume and the second logical volume.

2. The method of claim 1, further comprising:

in response to determining the storage device is not associated with a second logical volume, altering the operating state of the storage device in response to not receiving the request to access the first logical volume over the interval.

3. The method of claim 2, further comprising:

detecting the request while the storage device is in a reduced operating state; and altering the reduced operating state of the storage device to service the request.

4. The method of claim 1, further comprising:

determining if the request can be serviced without altering the operating state of the storage device; and servicing the request in response to determining if the request can be serviced.

5. The method of claim 4, further comprising:

accessing a memory in association with determining if the request can be serviced; and using the memory to service the request.

6. The method of claim 1, further comprising:

detecting a second storage device operably associated with the first logical volume;

determining an availability of the second storage device to process the request using a logical volume manager (LVM); and altering an operating state of the second storage device by communicating a command from the LVM to a controller operably coupled to the second storage device.

7. The method of claim 1, further comprising:

detecting a plurality of storage devices available to the first logical volume; and altering an operating state of a second storage device of the plurality of storage devices in response to the request.

8. The method of claim 7, wherein the altering of an operating state includes increasing a power output to the second storage device in response to detecting an I/O request.

9. The method of claim 7, wherein the altering of an operating state includes decreasing a power output to the second storage device in response to detecting an I/O request.

10. The method of claim 1, further comprising:

determining a second operating state of the second logical volume; and altering the operating state of the storage device in response to determining the second operating state of the second logical volume.

11. The method of claim 1, further comprising:

detecting the storage device in a power save operating state;

communicating a status of the storage device to a requestor;

altering the power save operating state to an active operating state; and processing the request using the storage device in the active operating state.

12. The method of claim 11, further comprising:

communicating a delay time value to the requestor in association with the status; and receiving a second request from the requestor after a period approximately equal to the delay time value.

13. An information handling system comprising:

a controller operable to alter an operating state of a plurality of storage devices; and a logical volume manager operably coupled to the controller, the logical volume manager operable to:

detect an I/O request to access information stored in association with a first logical volume operably associated with the plurality of storage devices over an access period;

determine if a first storage device of the plurality of storage devices is operably associated with a second logical volume and the first logical volume, such that the first storage device is operable to service access requests to the first logical volume and to service access requests to the second logical volume;

determine an operating state of a second storage device of the plurality of storage devices operably associated with the second logical volume and the first logical volume such that the second storage device is operable to service access requests to the first logical volume and to service access requests to the second logical volume; and initiate reducing the operating state of the plurality of storage devices when the I/O request is not detected within the access period.

14. The information handling system of claim 13, further comprising:

a storage device enclosure processor operable to receive an input identifying an operating status of each of the plurality of storage devices; and a power output interface operably coupled to the storage device enclosure processor, the power output interface operable to output power to the plurality of storage devices in response to identifying an operating status of each of the plurality of storage devices.

* * * * *